United States Patent
Tucker et al.

(10) Patent No.: US 12,174,217 B2
(45) Date of Patent: Dec. 24, 2024

(54) OPTICAL WIND LIDAR-BASED MULTIFUNCTIONAL INSTRUMENT FOR ENHANCED MEASUREMENTS AND PREDICTION OF CLEAR AIR TURBULENCE AND OTHER WIND-BASED AVIATION RELATED PHENOMENA

(71) Applicant: BAE Systems Space & Mission Systems Inc., Broomfield, CO (US)

(72) Inventors: Sara C. Tucker, Boulder, CO (US); Bevan D. Staple, Longmont, CO (US); Jennifer H. Lee, Boulder, CO (US); Cynthia Wallace, Louisville, CO (US); Carl S. Weimer, Boulder, CO (US)

(73) Assignee: BAE Systems Space & Mission Systems Inc., Broomfield, CO (US)

( * ) Notice: Subject to any disclaimer, the term of this patent is extended or adjusted under 35 U.S.C. 154(b) by 883 days.

(21) Appl. No.: 17/057,582

(22) PCT Filed: Nov. 30, 2018

(86) PCT No.: PCT/US2018/063429
§ 371 (c)(1),
(2) Date: Nov. 20, 2020

(87) PCT Pub. No.: WO2020/046407
PCT Pub. Date: Mar. 5, 2020

(65) Prior Publication Data
US 2021/0199685 A1      Jul. 1, 2021

Related U.S. Application Data

(63) Continuation of application No. 16/192,563, filed on Nov. 15, 2018, now abandoned.
(Continued)

(51) Int. Cl.
*G01P 5/26* (2006.01)
*G01W 1/00* (2006.01)
(Continued)

(52) U.S. Cl.
CPC .................. *G01P 5/26* (2013.01); *G01W 1/10* (2013.01); *G06N 3/08* (2013.01); *G06N 20/00* (2019.01);
(Continued)

(58) Field of Classification Search
CPC ..... G01P 5/26; G01W 1/10; G01W 2001/003; G06N 3/08; G06N 20/00; G08G 5/0039;
(Continued)

(56) References Cited

U.S. PATENT DOCUMENTS 3,856,402 A    12/1974   Low et al.
4,195,931 A    4/1980   Hara
(Continued)

FOREIGN PATENT DOCUMENTS

JP      2010043984 A   *   2/2010

OTHER PUBLICATIONS

Machine Translation JP-2010043984-A (Year: 2010).*
(Continued)

*Primary Examiner* — Anne Marie Antonucci
*Assistant Examiner* — Misa H Nguyen
(74) *Attorney, Agent, or Firm* — Sheridan Ross P.C.

(57) ABSTRACT

A multiple functional instrument is provided. The instrument includes an optical autocovariance function interferometer that can feature multiple fields of view to detect winds in the atmosphere. The instrument can include an infrared camera to detect atmospheric temperatures and the presence of clouds, and a detector assembly that detects the polarization of light returned to the interferometer. Data collected by the instrument can be provided to a deep and (Continued)

reinforcement learning algorithm for real-time prediction of clear air turbulence and other wind-based aviation safety phenomena. Moreover, predicted and actual conditions can be correlated and used to train a deep learning algorithm to enable more accurate predictions. The instrument can be carried by an aircraft or other platform and operated to detect clear air turbulence or other atmospheric phenomena, and to provide instructions regarding flight parameters including wind-aided navigation in order to minimize the effect of predicted turbulence.

20 Claims, 4 Drawing Sheets

Related U.S. Application Data

(60) Provisional application No. 62/723,675, filed on Aug. 28, 2018.

(51) Int. Cl.
*G01W 1/10* (2006.01)
*G06N 3/08* (2023.01)
*G06N 20/00* (2019.01)
*G08G 5/00* (2006.01)

(52) U.S. Cl.
CPC ......... *G08G 5/0039* (2013.01); *G08G 5/0047* (2013.01); *G01W 2001/003* (2013.01)

(58) Field of Classification Search
CPC ....... G08G 5/0047; Y02A 90/10; G01S 17/95; G01S 17/89
See application file for complete search history.

(56) References Cited

U.S. PATENT DOCUMENTS

| | | | |
|---|---|---|---|
| 4,243,323 A | 1/1981 | Frosch et al. | |
| 4,652,122 A | 3/1987 | Zincone et al. | |
| 4,875,770 A | 10/1989 | Rogers et al. | |
| 4,988,190 A | 1/1991 | Miles | |
| 5,155,551 A | 10/1992 | Vidrine et al. | |
| 5,216,477 A | 6/1993 | Korb | |
| 5,541,728 A | 7/1996 | Dierking | |
| 6,751,532 B2 | 6/2004 | Inokuchi | |
| 7,359,057 B2 | 4/2008 | Schwiesow | |
| 7,463,341 B2 | 12/2008 | Halldorsson et al. | |
| 7,929,215 B1 | 4/2011 | Grund et al. | |
| 7,933,002 B2 | 4/2011 | Halldorsson | |
| 8,072,584 B2 | 12/2011 | Caldwell et al. | |
| 8,077,294 B1 | 12/2011 | Grund et al. | |
| 8,508,721 B2 | 8/2013 | Cates et al. | |
| 8,509,966 B2 | 8/2013 | Coulmeau et al. | |
| 9,097,799 B2 | 8/2015 | Inokuchi | |
| 9,881,507 B2 * | 1/2018 | Rencher | G08G 5/0021 |
| 9,924,138 B1 | 3/2018 | Brown | |
| 10,184,841 B1 | 1/2019 | Englert et al. | |
| 10,295,673 B1 | 5/2019 | Tucker | |
| 10,613,229 B2 | 4/2020 | Applegate et al. | |
| 10,761,195 B2 * | 9/2020 | Donovan | G01S 7/484 |
| 11,046,430 B1 | 6/2021 | Melton et al. | |
| 11,204,414 B2 * | 12/2021 | Haraguchi | G01S 7/4911 |
| 2007/0069941 A1 * | 3/2007 | Pearlman | G01S 7/003 342/26 B |
| 2007/0171397 A1 * | 7/2007 | Halldorsson | G01S 7/497 356/28 |
| 2008/0043234 A1 | 2/2008 | Mirand et al. | |
| 2009/0091766 A1 | 4/2009 | Hirose | |
| 2011/0222048 A1 | 9/2011 | Englert et al. | |
| 2012/0101747 A1 | 4/2012 | Kielkopf et al. | |
| 2012/0194822 A1 | 8/2012 | Buijs | |
| 2012/0273571 A1 | 11/2012 | Kremer | |
| 2013/0184838 A1 | 7/2013 | Tchoryk et al. | |
| 2015/0233962 A1 | 8/2015 | Tchoryk et al. | |
| 2016/0202283 A1 | 7/2016 | Wang et al. | |
| 2017/0038192 A1 | 2/2017 | Chen et al. | |
| 2017/0248700 A1 * | 8/2017 | Lodden | G01P 21/025 |
| 2018/0224859 A1 * | 8/2018 | Brudner | G01W 1/10 |

OTHER PUBLICATIONS

Grund et al. "Development and Demonstration of an Optical Autocovariance Direct Detection Wind Lidar," Earth Science Technology Forum 2010, 2010, 6 pages.
Herbst et al. "Design of a monolithic Michelson interferometer for fringe imaging in a near-field, UV, direct-detection Doppler wind lidar," Applied Optics, Sep. 2016, vol. 55, No. 25, pp. 6910-6929.
Tucker et al. "The Athena-OAWL Doppler Wind Lidar Mission," EPJ Web of Conferences, 2016, The 27th International Laser Radar Conference (ILRC 27), vol. 119, 01002, 4 pages.
Tucker et al. "Comparing and contrasting the Optical Autocovariance Wind Lidar (OAWL) and coherent detection lidar," Coherent Laser Radar Conference, Barcelona, Spain, Jun. 17-20, 2013, 4 pages.
International Search Report and Written Opinion for International (PCT) Patent Application No. PCT/US2018/063429, dated Mar. 28, 2019 11 pages.
International Search Report and Written Opinion for International (PCT) Patent Application No. PCT/US2019/028524, dated Aug. 27, 2019 13 pages.
Official Action for U.S. Appl. No. 16/265,589, dated Sep. 16, 2019 14 pages.
Notice of Allowance for U.S. Appl. No. 16/265,589, dated Jan. 16, 2020, 8 pages.
Official Action for U.S. Appl. No. 16/192,563, dated Aug. 30, 2021 31 pages.
International Preliminary Report on Patentability for International (PCT) Patent Application No. PCT/US2018/063429, dated Mar. 11, 2021 8 pages.
International Preliminary Report on Patentability for International (PCT) Patent Application No. PCT/US2019/028524, dated Mar. 11, 2021 8 pages.

* cited by examiner

OPTICAL WIND LIDAR-BASED MULTIFUNCTIONAL INSTRUMENT FOR ENHANCED MEASUREMENTS AND PREDICTION OF CLEAR AIR TURBULENCE AND OTHER WIND-BASED AVIATION RELATED PHENOMENA

CROSS-REFERENCE TO RELATED APPLICATIONS

This application is a national stage application under 35 U.S.C. 371 and claims the benefit of PCT Application No. PCT/US2018/063429 having an international filing date of 30 Nov. 2018, which designated the United States, which PCT application claimed the benefit of U.S. Provisional Patent Application Ser. No. 62/723,675, filed Aug. 28, 2018, and the benefit of U.S. patent application Ser. No. 16/192,563, filed Nov. 15, 2018, which claimed the benefit of U.S. Provisional Patent Application Ser. No. 62/723,690, filed Aug. 28, 2018, the entire disclosures of which are hereby incorporated herein by reference.

FIELD

The present disclosure is directed to systems and methods for measuring and predicting wind-based aviation safety phenomena including providing wind-aided navigation to an aircraft based on data from multiple sources.

BACKGROUND

Severe wind conditions such as clear air turbulence encounters by general and commercial aviation continue to pose significant safety and flight efficiency concerns. Almost anyone who has flown commercially has had an unpleasant experience with turbulence and has a tale to tell about it. According to some estimates, turbulence encounters account for well over 75% of all weather-related injuries on commercial aircraft and amount to at least $200 M annually in costs due to passenger and crew injuries and aircraft damage. Consequently, there is an urgent need to provide accurate and real-time wind and turbulence predictions and courses-of-action to meet the safety and navigation needs of aviation communities.

However the real-time information about the current turbulent state of the atmosphere required by pilots and dispatchers for making tactical en-route decisions is not adequately provided via the Federal Aviation Administration's (FAA's) thunderstorm avoidance guidelines, by currently operational turbulence forecasts, or future systems such as the Graphical Turbulence Guidance (GTG) "Nowcast" (N-GTG) at the National Center for Atmospheric Research (NCAR), which is slated to combine turbulence observations, inferences and forecasts to produce new turbulence assessments approximately every 15 minutes.

Moreover, despite the success of machine learning in a variety of tasks, applications to the problem of weather forecasting have been limited. Exceptions include the use of Bayesian Networks for precipitation forecasts and temporal modeling via Restricted Boltzmann Machines (RBM). To date, uses of machine learning for weather prediction have been limited in that almost all methods consider only one variable at a time and do not explore the joint spatiotemporal statistics of multiple weather phenomena.

Light detection and ranging (lidar) systems have been developed that are capable of remotely measuring range-resolved wind speeds for use in various applications, including but not limited to wind-aided navigation of a platform, weather forecasting, air quality prediction, air-traffic safety, and climate studies. In general, lidar operates by transmitting light from a laser source to a volume or surface of interest and detecting the time of flight for the backscattered light to determine a range to the scattering volume or surface.

A Doppler wind lidar also measures the Doppler frequency shift experienced by the light scattered back to the instrument due to the motions of molecules and aerosols (e.g. particles and droplets) in the atmospheric scattering volumes, which is directly tied to the speed of the wind in that volume, relative to the lidar line of sight (LOS). The wind speed along the LOS is determined by projecting the wind speed and direction (the wind vector) onto that LOS.

One potential application for wind lidar systems is in connection with the detection of atmospheric turbulence and wind shear. As noted, atmospheric turbulence is a primary cause of weather related injuries to aircraft passengers and flight crews. Accordingly, detecting atmospheric turbulence is of great interest. However, systems for detecting turbulence, and in particular clear air turbulence, that can be carried by aircraft have been unavailable. In particular, a system that was compact and that provided a suitably wide field of view that could be deployed in a conventional aircraft has been unavailable.

Moreover, most wind measurements consist of a single wind Doppler lidar instrument. Such instruments generally have a narrow field of view (FOV), limiting the area of surveillance. Additionally, such instruments consist of a single wavelength, which limits the data diversity for increasing the accuracy of aviation safety weather-related predictions.

SUMMARY

Embodiments of the present disclosure overcome the limitations described above by providing systems and methods incorporating a multifunctional instrument that includes an optical autocovariance wind lidar (OAWL) based instrument. In accordance with at least some embodiments of the present disclosure, the wind lidar based instrument is configured to perform wind measurements. The wind lidar based instrument can also make measurements of aerosol concentrations. In accordance with further embodiments of the present disclosure, the multifunctional instrument includes a camera or wide field of view infrared (IR) sensor for thermal measurement of atmospheric behavior. The multifunctional instrument can also include one or more on-board accelerometers, which can be used to compare turbulence predictions to turbulence actually encountered by an aircraft. As used herein, aircraft can include, but are not limited to, airplanes, helicopters, airships (including blimps), gliders, hot air balloons, stratospheric balloons, and Unmanned Aerial Vehicles (UAVs) In accordance with further embodiments of the present disclosure, a multifunctional instrument is provided that includes a lidar system that is capable of obtaining wind speed measurements and aerosol/particle concentrations from multiple lines of sight. Moreover, in accordance with at least some embodiments of the present disclosure, measurements from multiple lines of sight can be made simultaneously. Alternatively or in addition, a lidar capable of making simultaneous measurements over multiple lines of sight as described herein can include an interferometer that is configured to operate at multiple wavelengths, and/or that can make wind and aerosol concentration measurements simultaneously.

In accordance with still further embodiments of the present disclosure, a multifunctional instrument is provided that incorporates a processor and a deep learning algorithm. The deep learning algorithm can be operated to collect, fuse, and correlate data generated by the lidar alone or by the lidar and other sensors included in the multifunctional instrument, to provide predictions regarding turbulence in the atmosphere. Moreover, the deep learning algorithm can be operated to alter or suggest alterations in the course of an aircraft carrying the multifunctional instrument, or of other aircraft.

Further embodiments of the present disclosure overcome the limitations described above by providing unique and novel methods for combining data fusion of multi-source information on which the latest in artificial intelligence-based deep and reinforcement learning processing algorithms are applied in a hybrid model to provide accurate and real-time wind predictions for wind-aided navigation of a platform, turbulence predictions, and courses-of-actions to meet the needs of aviation communities.

Additional features and advantages of embodiments of the disclosed systems and methods will become more readily apparent from the following description, particularly when taken together with the accompanying drawings.

DETAILED DESCRIPTION

Figure 1:
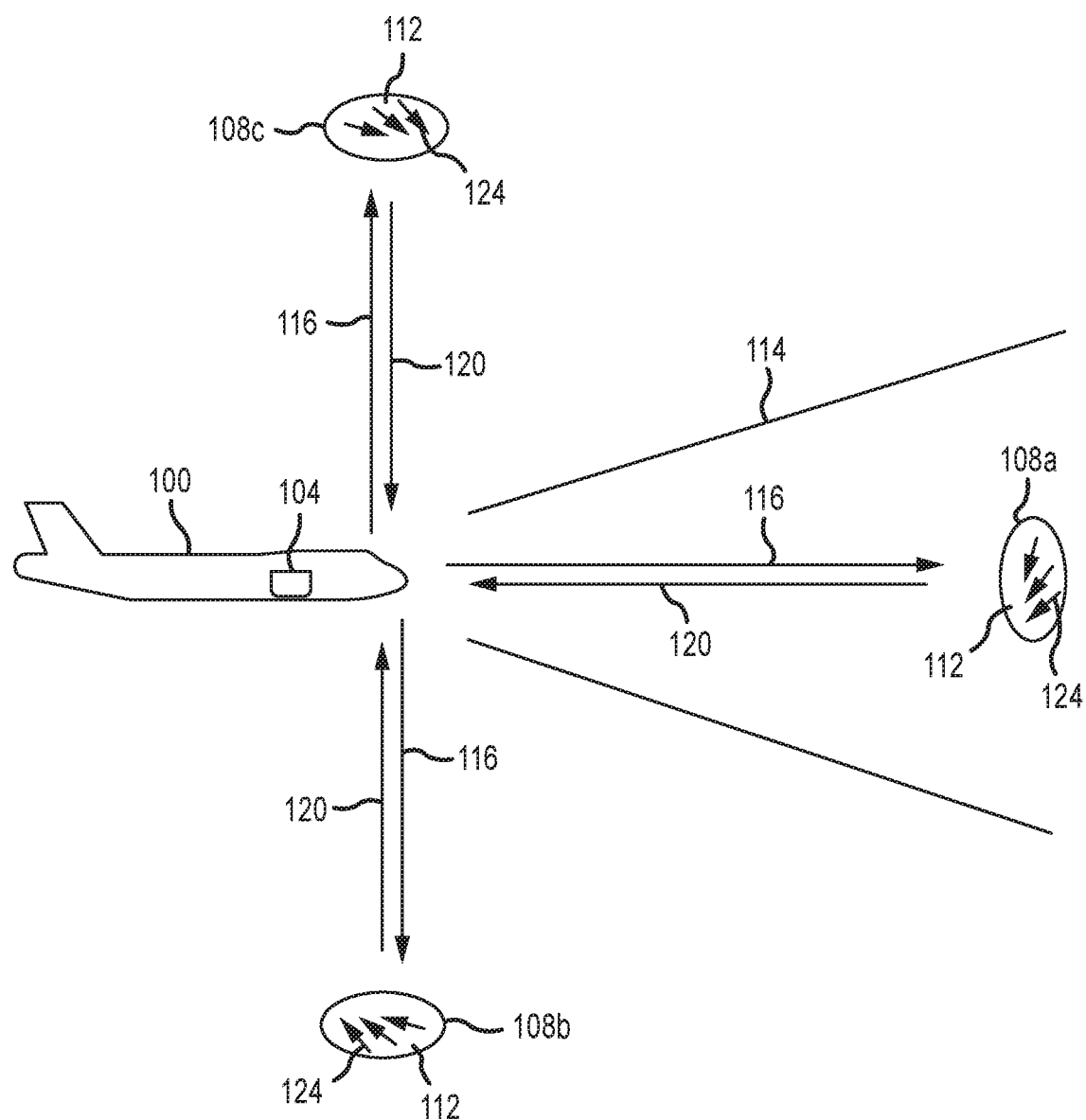
FIG. 1 depicts an aircraft carrying a multifunctional instrument in accordance with embodiments of the present disclosure.

FIG. 1 depicts an aircraft 100 carrying a multifunctional instrument or system 104 in accordance with embodiments of the present disclosure. As used herein, an aircraft 100 can include, but is not limited to, an airplane, an airship, a blimp, a glider, a hot air balloon, a stratospheric balloon, a helicopter, and an unmanned aerial vehicle (UAV). The multifunctional instrument 104 is capable of obtaining atmospheric measurements from within different fields of regard 108. For example, and as discussed in greater detail elsewhere herein, one or more lidars incorporating an optical autocovariance interferometer can be included in the multifunctional instrument 104 to obtain relative line of sight wind speeds from selected ranges within different fields of regard 108 that intersect different target volumes 112. In addition, a wide field of view (WFOV) infrared (IR) camera can be included in the multifunctional instrument 104 for obtaining temperature information at different locations within that device's field of view 114.

More particularly, a lidar system included in a multifunctional instrument 104 in accordance with embodiments of the present disclosure can have multiple fields of regard 108, from which relative line of sight wind speeds can be obtained at selected ranges from the multifunctional instrument 104. These different fields of regard 108 can include a forward looking field of regard 108a, a downward looking field of regard 108b, and an upward looking field of regard 108c. Although the different fields of regard 108 depicted in the figure are shown at a spacing of approximately 90 degrees from one another, different spacings are possible. For example, the downward 108b and upward 108c facing fields of regard 108 can be at angles of less than 90 degrees from the forward-looking field of regard 108a. Moreover, additional fields of regard, including side looking fields of regard, or fields of regard spaced at angles of greater than 90 degrees, can be provided. As can be appreciated by one of skill in the art after consideration of the present disclosure, the lidar system operates to transmit a beam of light as an output signal or beam 116 along or within a corresponding field of view. The transmitted beam can be scanned or varied in angle relative to the multifunctional instrument 104 to collect data from within the field of regard 108. Alternatively or in addition, a lidar system included in the multifunctional instrument 104 can comprise an imaging or flash lidar with a relatively large field of view that is coincident with a corresponding field of regard 108, or that can be scanned within the field of regard 108.

Particles in the atmosphere along the path of the transmitted light reflect that light back to an interferometer included in the lidar system. For example, at high altitudes (e.g. above 20 km), molecules within a target volume 112 in the atmosphere will backscatter at least some of the transmitted light as a return signal 120. At lower altitudes (e.g. below 20 km) molecules and aerosols within a target volume 112 in the atmosphere will backscatter at least some of the transmitted light as a return signal 120. The return signal 120 comprising at least some of the backscattered light is received by the lidar system included in the multifunctional instrument 104, and any Doppler shift experienced by the light as a result of a relative line of sight wind speed at a range corresponding to a target volume 112 can then be detected, to determine the relative line of sight windspeed within that target volume 112. This information can then be used to detect the presence of turbulence 124, including but not limited to clear air turbulence, in the target volume 112, and to obtain wind measurements that can be used for wind-aided navigation of the platform, weather forecasting, and the like. Moreover, wind profiles based on wind measurements made by the multifunctional instrument 104 at the aircraft 100 level and below can be provided to global and local weather forecasting offices and systems in near real-time to improve forecast model initialization.

In accordance with further embodiments of the present disclosure, the polarization of light in the return signal 120 can be used, alone or in combination with information received from other sensors, to detect the presence of ice, ash, or dust particles within the target volume 112. Although the detection of turbulence and provision of aviation safety weather-related data for an aircraft 100 carrying the instrument 104 and for use by other aircraft or aviation safety information consumers is one application of embodiments of the present disclosure, other applications may include placing a multifunctional system 104 in satellites, in space vehicles, in balloons, or in other vehicles or locations, and with any number of different look angles in different directions.

Figure 2:
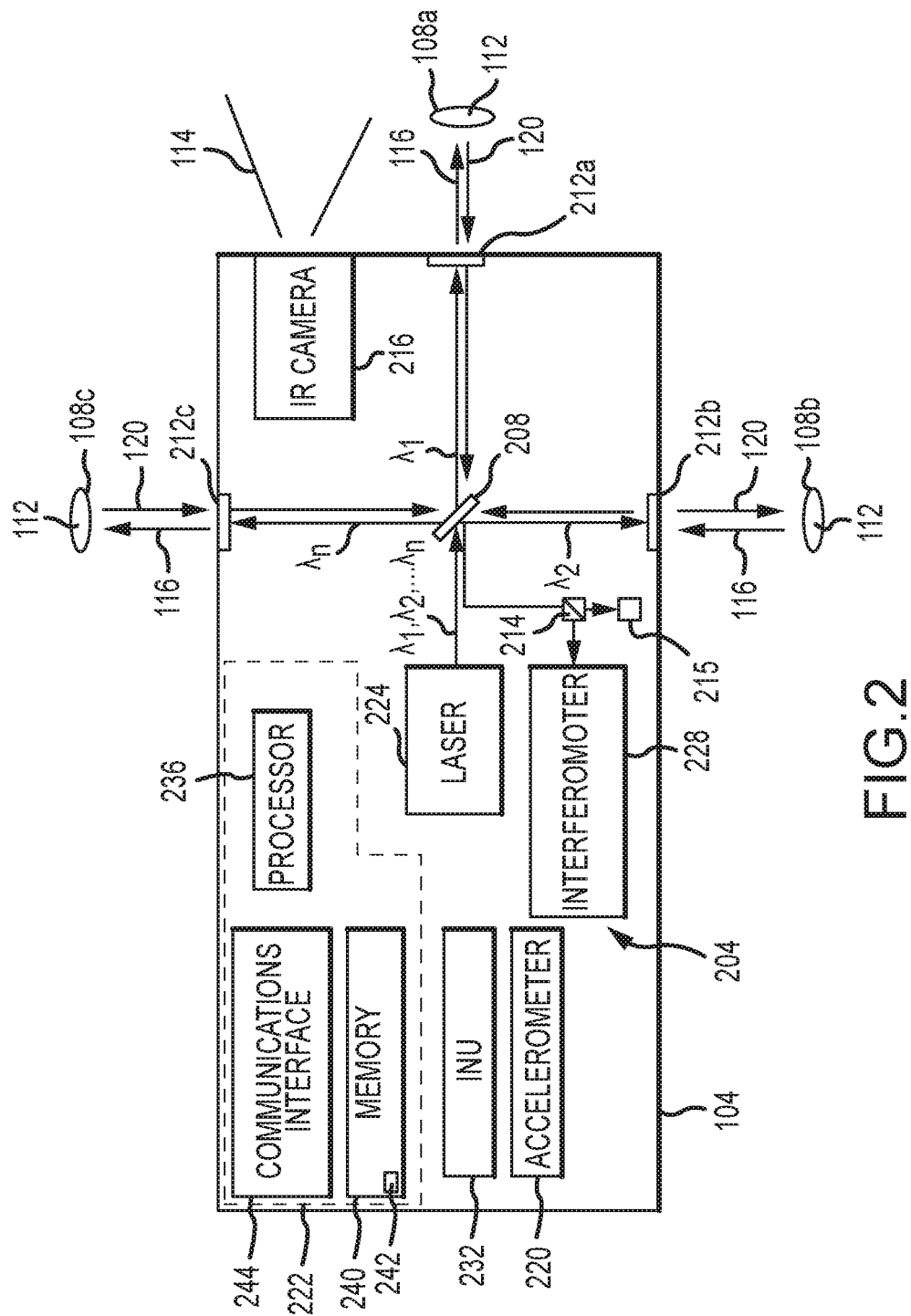
FIG. 2 depicts components of a multifunctional instrument in accordance with embodiments of the present disclosure.

FIG. 2 depicts an arrangement of components of a multifunctional instrument or system 104 in accordance with embodiments of the present disclosure. In general, the multifunctional instrument 104 includes a lidar system 204. The lidar system 204 may be in the form of an optical autocovariance wind lidar that incorporates a laser or light source 224 and an interferometer 228. The laser 224 can output beams of light at multiple wavelengths ($\lambda_1, \lambda_2, \ldots \lambda_n$)

within a time sequenced manner, or simultaneously. Alternatively, multiple laser sources 224 operating at different wavelengths can be provided. The lidar system 204 can include a beam division system or mechanism 208 that operates to separate output beams 116 of different wavelengths and direct the separated beams 116 along different lines of sight within different fields of regard 108. Moreover, the multifunctional instrument 104 can include scan mirrors, variable optics, or other scan mechanisms 212 for scanning an output beam 116 across a target volume 112, and for receiving return signals 120 from along selected lines of sight within the field of regard 108 encompassing the target volume 112. More particularly, the beam division system 208 operates to direct light of different wavelengths along different paths. A scan mechanism 212 can be provided for each of the different paths (wavelengths). Accordingly, a scan mechanism 212a-c can direct a respective beam of output light 116 along a selected look angle within an associated field of regard 108a-c, and can further operate to receive returns 120 from within the associated field of regard 108. Accordingly, scanning mechanisms 212 can scan the output beams 116 to obtain returns 120 from different locations within a target volume 112, such that measurements of wind speed or other phenomena can be made from select locations within the target volume 112.

In accordance with at least some embodiments of the present disclosure, the multifunctional instrument 104 includes components for detecting a proportion of cross-polarized light in the return signal 120. In such embodiments, the multifunctional instrument 104 can include a polarizing beam splitter 214 that sends co-polarized light included in the return signal 120 to the interferometer 228, and cross-polarized light to one or more detectors 215. More particularly, one detector operable to determine an intensity of the co-polarized light included in the interferometer 228 and one detector 215 operable to determine an intensity of the cross-polarized light is provided for each wavelength of interest.

The multifunctional instrument 104 also includes a wide field of view infrared camera 216. The infrared camera 216 can be operated to obtain spatial and temporal temperature information from within a relatively wide field of view 114. Moreover, the wide field-of-view infrared camera can be pointed so as to encompass the forward-looking field-of-regard 108a of the lidar (see, e.g., FIG. 1), and can be used to measure spatial and temporal temperatures and atmospheric conditions such as turbulence. As an example, but without limitation, the infrared camera 216 may comprise a wide field of view infrared sensor for measuring the spatial and temporal temperatures and atmospheric conditions such as turbulence and providing a large area of surveillance over a wide wavelength range (e.g. 7.5 to 14 µm). For example, the infrared camera 216 can detect the presence of clouds and potential turbulent activity along the direction of travel of the aircraft 100, and such information can be used as an input for making aviation safety weather-related predictions. In addition, such information can be used to assist in steering an output beam 116 of the lidar system 204. As an alternative or in addition to an infrared camera 216, a hyperspectral or multispectral instrument, including an instrument with a wide field of view, can be included in the multifunctional instrument 104.

In accordance with further embodiments of the present disclosure, the multifunctional instrument 104 can include an accelerometer 220, which can be operated to measure the intensity of turbulence experienced by the aircraft 100, and to provide a correlation between turbulence predictions made through operation of the lidar system 204 and actual turbulence conditions experienced by the aircraft 100.

Embodiments of the multifunctional instrument 104 described herein additionally include an inertial navigation unit (INU) 232, such as but not limited to a global positioning system (GPS) INU, which can operate to provide aircraft 100 location information. Such information can be used to support various functions, including but not limited to geo-locating detected or predicted aviation safety related weather conditions.

The various sensors and instruments such as the lidar system 204, the wide field of view camera 216, the accelerometer 220, the beam division 208 and scanning 212 systems, and the related mechanisms of the multifunctional instrument 104 can all be interconnected to a control system 222. As discussed in greater detail elsewhere herein, the various components can work in conjunction with one another and the control system 222 to make measurements of atmospheric conditions, and to make predictions regarding the presence of turbulence in the atmosphere, including but not limited to along the direction of motion of the aircraft 100, to correlate windspeed and temperature measurements and related turbulence predictions to turbulence actually experienced by the aircraft 100, to detect the presence of icing conditions, to detect the presence of volcanic ash or other particles, and to provide such or other information that is pertinent to aviation safety or navigation or detected weather conditions, to other aircraft, aviation safety related weather information consumers, or general weather information consumers.

The control system 222 of the multifunctional instrument 104 can include various processing and operating components, including but not limited to a processor 236, memory 240, and a communications interface 244. As can be appreciated by one of skill in the art after consideration of the present disclosure, the processor 236 can include a general purpose programmable processor, a graphics processing unit (GPU), a field programmable gate array (FPGA), a controller, or a set of different processor devices or chips. The memory 240 can include solid-state volatile or non-volatile memory, such as flash memory, RAM, DRAM, SDRAM, or the like. The memory 240 can also include various other types of memory or other data storage devices, such as magnetic storage devices, optical storage devices, or the like.

The processor 236 can generally operate to execute programming code or instructions stored in the memory 240, for the operation of the multifunctional instrument 104, including coordination of the operation of components within the multifunctional system 104. Moreover, the processor 236 can execute application programming or instructions stored in the memory 240 for the onboard prediction of aviation safety related weather conditions, and improved flight navigation paths including but not limited to the detection of clear air turbulence along the path of the aircraft 100. In accordance with still other embodiments of the present disclosure, such predictions can be made in connection with wind speed measurements taken by the lidar system 204 along lines of sight other than those within the forward-looking field of regard 108a, such as a downward looking field of regard 108b, or an upward looking field of regard 108c. The measurements can provide shear information related to potential turbulence or enhanced aircraft navigation and fuel efficiency. Data collected or generated by the sensors of the multifunctional instrument 104 can be stored in the memory 240, presented to the crew of the aircraft 100, or communicated using the communication interface 244 to other systems, such as aviation safety or navigation related weather information consumers, other aircraft, weather services, or the like.

An example of application programming or instructions that can be stored in the memory 240 and executed by the processor 236 is a deep learning algorithm 242. The deep learning algorithm 242 can operate to collect, fuse, and correlate data generated by the multifunction sensor 104, the infrared camera 216, the accelerometers 220, and external sources. The deep learning algorithm 242 can apply the data to make predictions regarding turbulence and other wind-based aviation safety and efficiency phenomena. This data can also be used to train the deep learning algorithm 242 to enable increasingly accurate predictions of wind based aviation safety phenomena or wind-aided navigation and efficiency. In addition, embodiments of the present disclosure can provide a deep learning algorithm 242 that can alter, or suggest alterations in, the course of the aircraft 100, in order to avoid turbulence or other wind based aviation safety or navigation phenomena.

Figure 3:
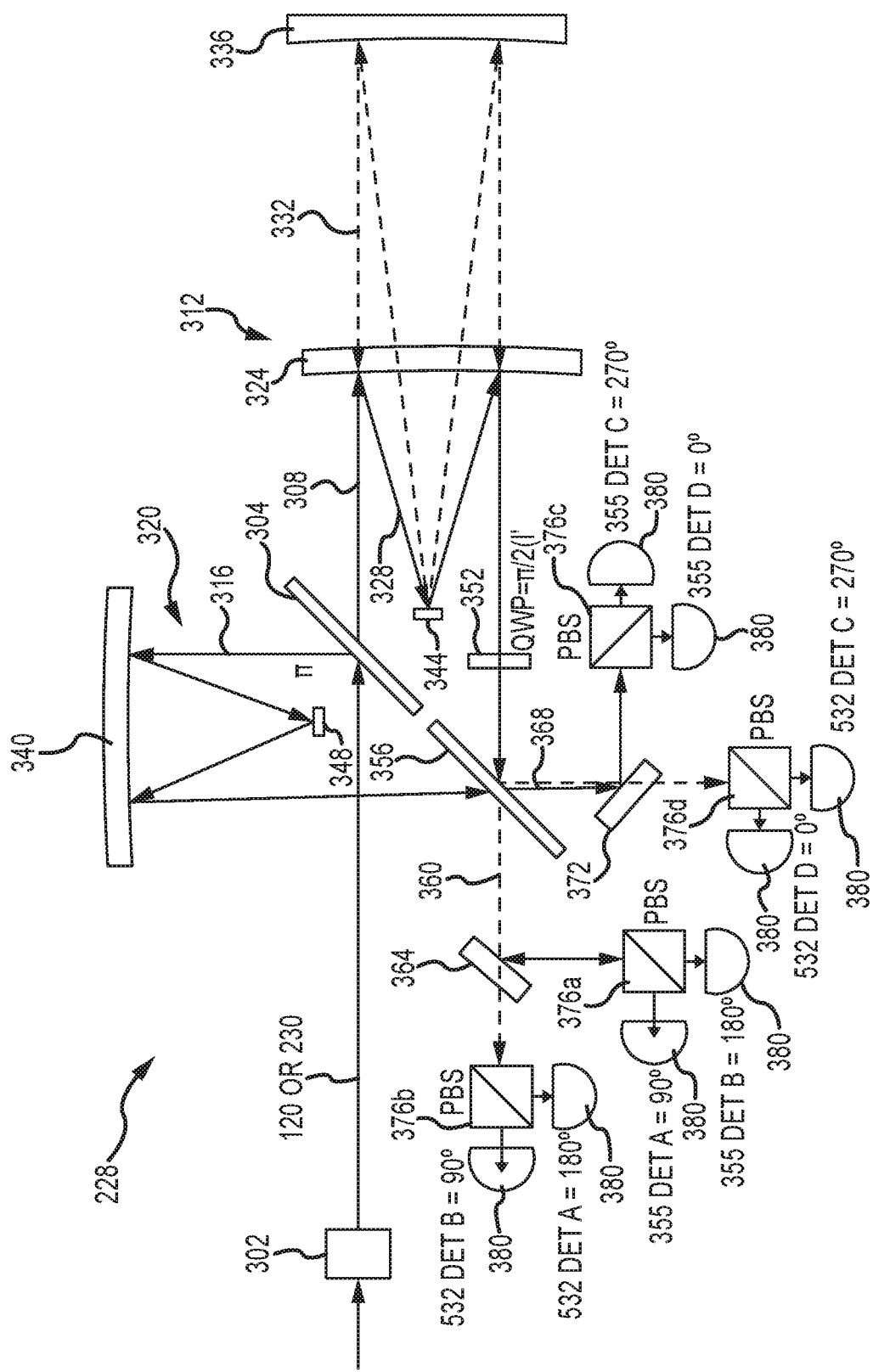
FIG. 3 depicts components of an interferometer in accordance with embodiments of the present disclosure.

As previously noted, in at least some embodiments of the present disclosure, the output beams 116 of the different fields of regard 108 are associated with different wavelengths. In such embodiments, an interferometer 228 capable of operating at different wavelengths simultaneously can be used. The components of such an interferometer 228 are depicted in FIG. 3. In this example, a dual wavelength interferometer 228 is illustrated and described. However, as can be appreciated by one of skill in the art after consideration of the present disclosure, the interferometer 228 can be configured to operate at a single wavelength or at more than two wavelengths. In general, the interferometer 228 receives dual wavelength light as an input. The light can comprise a time t0 sample of light output by the light source 224, and a time t>0 signal comprising the return signal 120 collected by the lidar system 204. The light is passed to the interferometer 228 by a transmission element 302, such as a fiber optic element and/or turning mirror, that delivers light of a mix of different polarizations to the interferometer 228. In accordance with embodiments of the present disclosure, the interferometer system or instrument 228 may include a first single or dual-wavelength non-polarizing beam splitter 304 that directs or transmits a first portion 308 of the received light to a first arm 312 and a second portion 316 of the received light 300 to a second arm 320 of the interferometer 228.

The first arm 312 includes a first reflective element 324 that is a first distance from the first non-polarizing beam splitter 304. The first reflective element 324 reflects light of a first wavelength 328 and transmits light of a second wavelength 332. The first reflective element 324, optionally in combination with a secondary mirror 344, defines a first optical path length for light of the first wavelength 328 included in the portion of light directed to the first arm 312. In accordance with embodiments of the present disclosure, the first reflective element 324 is a frequency selective mirror or dichroic element. The first arm 312 further includes a second reflective element 336 that is a second distance from the first non-polarizing beam splitter 304, where the second distance is greater than the first distance. The second reflective element 336 reflects light of the second wavelength 332. The second reflective element 336, optionally in combination with the same secondary mirror 344, defines a second optical path length for light of the second wavelength 332 included in the portion of light directed to the first arm 312.

The second arm 320 includes a third reflective element 340 that is a third distance from the first non-polarizing beam splitter 304, where the third distance is less than either of the first and second distances. The third reflective element 340, optionally in combination with a secondary mirror 348, defines a third optical path length for the light of the first and second wavelengths included in the portion of the light directed to the second arm 320.

The first 312 and second 320 arms may be configured as cat-eye assemblies with reflective elements 324, 336, and 340 that comprise non-planar, for example parabolic, mirrors that are combined with secondary mirrors 344 and 348 to provide a compact physical structure that provides an optical path difference for rays within a given one of the arms 312 and 320 that is essentially constant for all rays of a given wavelength within the field of view of the interferometer 228, regardless of the angle at which the rays entered the assembly. Systems and methods for providing such a field widening lens are described in U.S. Pat. No. 7,929,215, the contents of which are incorporated herein by reference in their entirety.

In accordance with further embodiments of the present disclosure, one of the arms 312 or 320 of the interferometer 228 includes a quarter wave plate 352 for introducing a delay to light of a linear polarization. The quarter wave plate 352 can be in, for example, the optical path traversed by the light directed along the first arm 312 of the interferometer 228.

Light at one or both wavelengths from the first 312 and second 320 arms is combined at a second non-polarizing beam splitter 356. A first portion 360 of the combined light is directed (e.g. is passed) by the second non-polarizing beam splitter 356 to a first wavelength selective or dichroic element 364, while a second portion 368 of the combined light is directed (e.g. is reflected) by the second non-polarizing beam splitter 356 to a second wavelength selective or dichroic element 372.

Light of the first wavelength is reflected by the first wavelength selective element 364 to a first polarizing beam splitter 376a, while light of the second wavelength is passed by the first wavelength selective element 364 to a second polarizing beam splitter 376b. Light of the first wavelength is reflected by the second wavelength selective element 372 to a third polarizing beam splitter 376c, while light of the second wavelength is passed by the second wavelength selective element 372 to a fourth polarizing beam splitter 376d. In accordance with embodiments of the present disclosure, each of the first through fourth polarizing beam splitters 376 is associated with first and second detectors 380. Moreover, a portion of the light received at each of the detectors has been delayed by a selected amount within the instrument relative to other light. The detectors 380 may comprise photodetectors that are operative to detect an amplitude (intensity) of light incident thereon. Moreover, the detector electronics assemblies 380 can be selected and configured to operate at speeds that are fast enough to resolve returns from different ranges, and thus from different portions of the target volume 112.

Specifically, light of the first wavelength that has traversed the first path length in the first arm 312 is combined with the light of the first wavelength that has traversed the third path length in the second arm 320, thus creating an interference pattern. The intensity of the interference pattern is measured at each of the detectors 380 associated with the first 376a and third 376c polarizing beam splitters, where the phase of the signals received at each of the detectors 380 are, through the combination of transmitting and reflecting elements within the interferometer 228, spaced in phase from neighboring signals of the same wavelength by 90 degrees. Similarly, light of the second wavelength that has traversed the second path length in the first arm 312 is combined with the light of the second wavelength that has traversed the third path length in the second arm 320, and the intensity of the interference pattern is measured by each of the detectors 380 associated with the second 376b and fourth 376d polarizing beam splitters, where the interference pattern signals received at each of the detectors 380 are spaced in phase from the other signals of the same wavelength by a nominal 90 degrees. Analysis can then be performed on the signals from each set of detectors (one set per wavelength) to determine a phase of the interferometer fringe (measured autocovariance function) of the light relative to the four detector phase positions. More particularly, the phase analysis procedure can be performed for each of the wavelengths at times t0 and t>0 to determine a relative phase change of the interferometer fringe (measured autocovariance function) of the light, from which a line of sight velocity of the atmospheric constituents from which the return light 120 was reflected may be retrieved. As can be appreciated by one of skill in art after consideration of the present disclosure, the measured relative phase change can then be used to determine the relative line of sight wind speed within the target volume 112 at a selected range.

In accordance with further embodiments of the present disclosure, the polarization of light received as part of a return signal 120 can be determined. In such embodiments, the transmitted beam 116 may be controlled to have a selected polarization. The intensity or amount of co-polarized light relative to the intensity or amount or cross-polarized light in the return signal 120 can then be determined for at least one of the wavelengths of light in the return signal 120. For example, a polarizing beam splitter 214 can be provided to divide light included in the return signal 120 into a co-polarized portion that is provided to the interferometer 228, and a cross-polarized portion that is provided to a detector 215. A large proportion of cross polarized light relative to co-polarized light in the return signal 120 indicates that ice, ash, or dust particles are present within the target volume 112. These measurements can be correlated with temperature measurements, for example taken by the infrared camera 216, to indicate the presence of icing conditions, volcanic ash, or other relevant conditions. Different proportions of cross polarized and co-polarized light (into the interferometer) in the return signal 120 can also indicate aerosol properties within the target volume 112.

As depicted, the multifunctional instrument 104 can be associated with multiple fields of regard, with multiple pointing angles of the lidar beam being included within each field of regard. For example, a first field of regard 108a can be directed so as to obtain measurements from ahead of the aircraft 100. This first field of regard 108a can operate in connection with an output beam 116 having a first wavelength. An example of a suitable wavelength is 355 nm, which is suitable for measuring winds and clear air turbulence in a direction forward of the aircraft 100 motion. A second field of regard 108b can be pointed in a downward direction, to obtain measurements from altitudes below the aircraft flight altitude. This second field of regard 108b can operate in connection with an output beam 116 having a second wavelength. An example of a suitable wavelength for a downward looking field of regard 108b is 1.5 μm, which is suitable for measuring winds in regions with higher aerosol/particle concentration including in clouds. A third field of regard 108c can be pointed upward, to obtain measurements from higher altitudes. This third field of regard 108c can operate in connection with an output beam 116c having a third wavelength. Example of suitable wavelengths for an upward looking field of regard 108c are 355 nm and 532 nm, both of which are suitable for measuring returns produced by molecules at high altitudes. Alternatively, the operational wavelengths can be limited to those that comply are eye-safe. Moreover, the transmitted beam associated with a given field of regard 108 can be scanned to widen the area from which measurements are taken.

In accordance with other embodiments of the present disclosure, measurements of wind speed within target volumes 112 associated with different fields of regard 108 can be obtained in a time sequenced manner, rather than simultaneously. Moreover, in accordance with at least some embodiments of the present disclosure, an interferometer 228 that provides different optical path differences to light of different wavelengths is not required. Measurements taken by the lidar system 204 can be used in combination with measurements taken by the wide angle infrared camera 216. Moreover, measurements taken by one of the instruments 204 or 216 can be used to determine operating parameters of the other instrument. For example, the look angle of the lidar system 204 can be selected based on the determined location of clouds detected by the infrared camera 216.

In accordance with embodiments of the present disclosure, in addition to a forward pointing field of regard 108a, information relative to turbulence that might affect the aircraft 100 can be obtained from downward looking 108b and/or upward looking 108c fields of view. For example, turbulence is indicated by the presence of different winds having different directions at different, adjacent altitudes. In addition, by enabling the detection of wind speeds at altitudes above and below the aircraft 100, embodiments of the present disclosure can facilitate the selection of an altitude at which a tailwind component is present, facilitating fuel efficiency and speed.

In accordance with still other embodiments of the present disclosure, actual turbulence experienced by the aircraft 100, as measured by one or more accelerometers 220, can be used to validate and/or refine the predictions made based on measurements taken by the other components of the multifunction system 104. In addition to measurements taken by the multifunctional system 104 directly, weather information from other sources that may lead to turbulence can be validated based on the indication of turbulence experienced by the aircraft 100.

Figure 4:
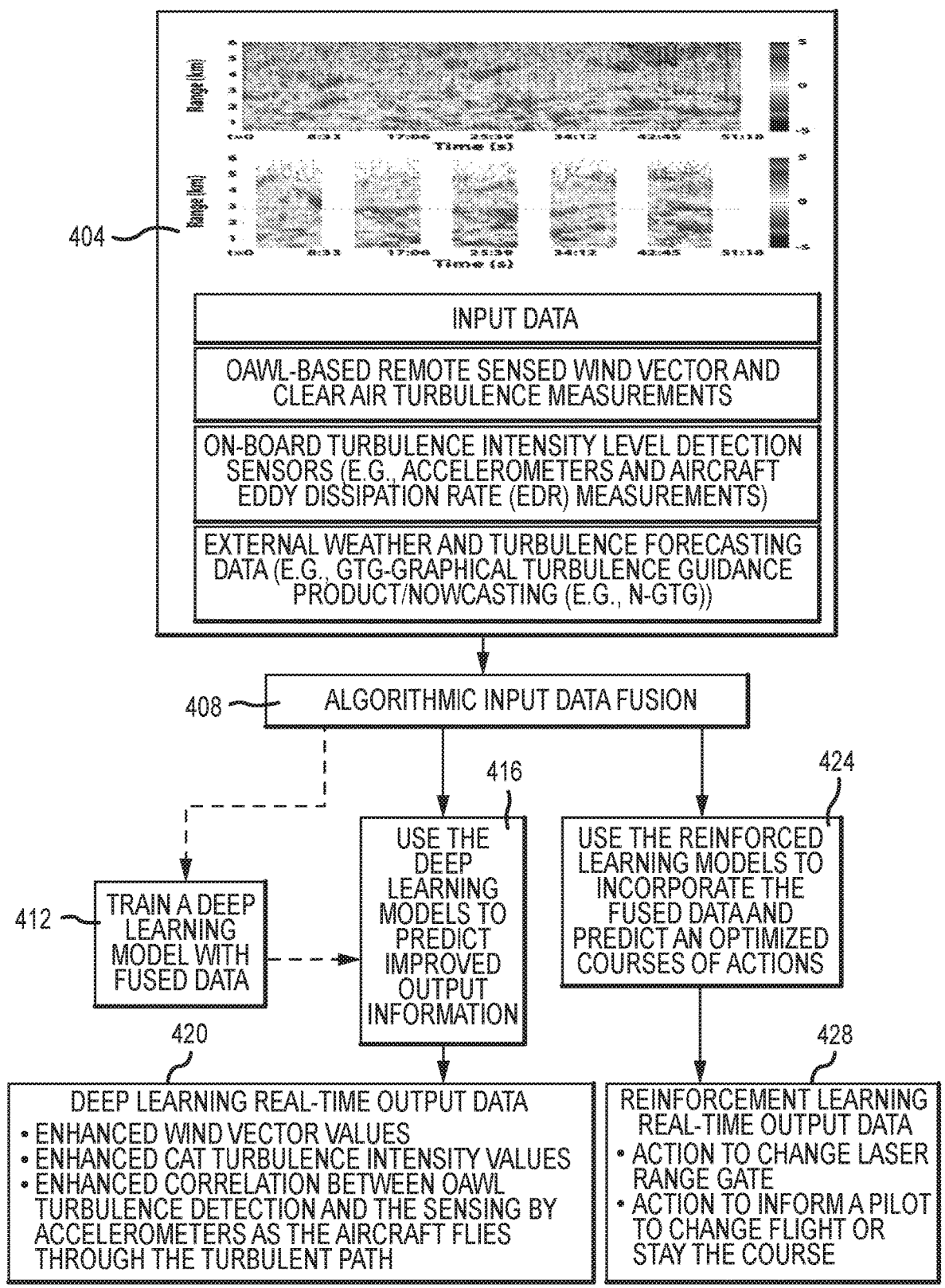
FIG. 4 depicts aspects of a process for applying deep learning processing to detect and predict turbulence and other atmospheric conditions in accordance with embodiments of the present disclosure.

FIG. 4 depicts a process for applying deep learning processing to detect turbulence in accordance with embodiments of the present disclosure. The process can be implemented by execution by the processor 236 of the deep learning algorithm 242 stored in memory 240. The process includes receiving and processing inputs from multiple data sources (step 404). These data sources can include inputs from a multifunctional system or instrument 104. Specific examples of input data include, but are not limited to, OAWL 204 based remotely sensed wind vector and clear air turbulence measurements, IR camera 216 based measurements of clouds, on board turbulence intensity level detection signals from sensors, such as accelerometers and aircraft eddy dissipation rate measurements, and external weather and turbulence forecasting data, such as graphical turbulence guidance product (GTG) and now casting (e.g. NGTG).

Algorithmic input data fusion is then performed (step 408). Data fusion can include correlating turbulence predictions made by execution of the deep learning algorithm 242 based on measurements by the lidar system 204 or other multifunctional instrument 104 sensors with actual turbulence encountered by the aircraft 100, for example as indicated by onboard accelerometers 220, or other sensors. In addition to temporal correlation, data fusion can include correlating the severity of the predicted turbulence to the severity of the turbulence detected by the aircraft at various altitudes and relative air speeds of turbulence encounters. Other examples of data fusion include correlating external weather and turbulence forecasting data with turbulence predictions made by the multifunction system 104 and/or actual turbulence measurements made by sensors included in the multifunction system 104. In accordance with further embodiments of the present disclosure, data fusion relative to atmospheric conditions other than or in addition to clear air turbulence can be performed. For example, correlations between predictions regarding icing conditions, the presence of organic ash, or other particles in the atmosphere and the conditions actually encountered by the aircraft 100 can be made. Data regarding the polarization of backscattered return laser light 120 and the detection of clouds using the infrared camera 216 are examples of sources of data regarding predictions of such other atmospheric conditions.

In a training mode, fused data can be used to train a deep learning model implemented by the learning algorithm 242 (step 412). In deep learning, the fused data is fed into the model and used to refine the predictions made regarding the atmospheric parameters of interest, such as clear air turbulence. More particularly, by comparing the data used to make the predictions with the actual turbulence measurements, refinements to the model or algorithm 242 to increase the accuracy of the predictions can be made. For instance, if the model implemented by the algorithm 242 predicts that turbulence of a certain predicted severity will be encountered at a particular range, based on measurements made by the multifunction sensor 104 from or about that range, the actual severity of any turbulence encountered when the aircraft 100 has reached the site of the predicted turbulence can be used to adjust the model of the algorithm 242 so that future predictions are more accurate. As can be appreciated by one of skill in the art after consideration of the present disclosure, actual turbulence measurements made by sensors, such as accelerometers 220 carried by the aircraft 100 as part of the multifunction sensor 104, can be located temporally, using clock information, and spatially, using the geolocation data, for example from an INU 232 included in the multifunction sensor 104. Such predictions can be refined to include characteristics of the turbulence predicted by the multifunction sensor 104 and the effects of turbulence on the particular aircraft 100 at various altitudes and airspeeds. Alternatively or in addition, turbulence predictions based on external weather and turbulence forecasting data alone or in combination with the sensor data regarding actual turbulence can be refined through the training of the algorithm 242. In accordance with embodiments of the present disclosure, the machine learning process includes supervised learning, with the algorithm 242 being trained to accurately detect the presence and severity of turbulence or other aviation safety weather-related parameters. In accordance with still other embodiments the present disclosure, the machine learning process can include reinforcement learning, in which feedback regarding the accuracy of predictions made from input data by the algorithm 242 is checked against measurements of actual instantiations of the predicted phenomenon, to allow the algorithm 242 performance to be continually improved.

The training process results in deep learning models that are better able to predict, based on the various inputs, such as data collected by the multifunction sensor 104 alone or in combination with data from external weather forecasting services or other instruments, the present clear air turbulence, or other weather conditions of interest. Accordingly, at step 416, the trained deep learning model 242 can be applied to predict output information with improved accuracy. The output information can comprise deep learning real time output data (step 420), which can include enhanced wind vector values, enhanced clear air turbulence intensity values, and enhanced correlation between OAWL turbulence detection by the multifunction sensor 104 and the sensing by accelerometers 220 as the aircraft 100 flies through the turbulent path.

In accordance with further embodiments of the present disclosure, the reinforcement learning models can be used to incorporate the fused data, and predict optimized courses of action for the aircraft 100 and/or the multifunction sensor 104 (step 424). This reinforcement learning real time output data (step 428) can include action to change the laser range gate for measurements made by the lidar system 204, and action to inform a pilot or an autopilot system to change flight parameters or to stay the course as the best reaction to predicted weather conditions.

The reinforcement learning models or algorithms 242 can include a number of different variants, such as Q-Learning, State-Action-Reward-State-Action (SARSA), Deep Q Network (DQN), and Deep Deterministic Policy Gradient (DDPG).

The execution of algorithms 242 implementing the deep learning model for processing data input from the multifunction sensor 104 and other data sources can be performed by the processor 236 included in the multifunctional instrument 104. Accordingly, embodiments of the present disclosure provide an onboard processing solution. In addition, turbulence and other pertinent weather information can be provided in real time or near real-time (e.g. after a processing delay of less than one second), to enable the flight parameters of an aircraft 100 to be adjusted in response to the predicted weather conditions. Moreover, the output of the algorithm 242 can include instructions or suggestions regarding actions in the form of flight parameters adjustments that can be made to minimize the effect of the predicted weather condition. In addition to increasing the accuracy of predictions through training, embodiments of the present disclosure enable the integration and fusion of data from multiple sources to further increase the accuracy of weather forecasting information, including predictions of clear air turbulence, provided by the algorithm 242.

Embodiments of the present disclosure can therefore include a multifunctional instrument 104 that incorporates optical autocovariance wind lidar-based instruments in combination with wide field of view cameras or sensors. For example, a lidar system 204 comprising an OAWL instrument having multiple lines of sight 108 can be included in the multifunctional instrument 104 for wind measurement and aerosol characterization, and a wide field of view IR sensor 216 can be included in the multifunctional instrument 104 for thermal measurement of atmospheric behavior. In accordance with still other embodiments, a multifunctional instrument 104 can additionally include on-board turbulence intensity level detection instruments, such as one or more accelerometers 220 for measuring turbulence for an aircraft 100 which includes platforms not limited to airplanes, helicopters, airships (including blimps), gliders, hot air balloons and Unmanned Aerial Vehicles (UAVs) carrying the multifunctional instrument 104. Accordingly, a multifunctional instrument 104 as described herein can provide enhanced measurements of clear air turbulence and other weather-based aviation safety and navigation phenomena (volcanic ash, icing conditions). Moreover, by incorporating more than one instrument or sensor, a multifunctional instrument 104 as described herein provides multi-source, diverse data sets for increasing the accuracy of and finding correlations in aviation safety weather-related predictions, and for providing wind-aided navigation information and guidance.

In addition, a multifunctional instrument 104 in accordance with embodiments of the present disclosure can provide multiple field of regard 108 OAWL instrument configurations which may incorporate multiple wavelengths, increasing the data diversity for aviation safety weather-related predictions. As examples, but without limitation, a lidar system 204 included in a multifunctional instrument 104 in accordance with embodiments of the present disclosure can feature a first field of regard 108$a$ comprising a horizontal LOS for measuring winds and clear air turbulence using an output beam 116$a$ having a first wavelength ($\lambda_1$) (e.g., 355 nm), a second field of regard 108$b$ comprising a down-looking LOS for measuring winds in clouds using an output beam 116$b$ having a second wavelength ($\lambda_2$) (e.g., 1.5 micron), and a third field of regard 108$c$ comprising an up-looking LOS for measuring winds using an output beam 116$c$ having a third wavelength ($\lambda_3$) (e.g., 532 nm). In addition, some or all of the fields of regard 108 can be associated with or established by a scanning mechanism 212, such as but not limited to a conical scan mechanism that varies a field of view or a line of sight of a lidar system 204.

In addition to one or more lidar systems 204, a multifunctional instrument 104 in accordance with embodiments of the present disclosure can include a wide FOV IR sensor or camera 216 for measuring the spatial and temporal temperatures in atmospheric conditions such as turbulence and providing a large area of surveillance over a wide wavelength band (e.g., 7.5 to 14 microns) for supporting weather-related predictions for aviation safety. Alternatively, or in addition, a camera 216 can be utilized to detect cloud formations or other phenomena, to enable the lidar system 204 to scan areas without cloud formations. Moreover, on-board turbulence intensity level detection sensors or accelerometers 220 can be included to provide correlation between OAWL turbulence detection and the amplitude of its impact for the given altitude and air speed conditions based on what is sensed as the aircraft 100 flies through the turbulent path.

Still further embodiments of the present disclosure provide a multifunctional instrument 104 that provides unique and novel methods of combining advanced data fusion, deep learning, and reinforcement learning algorithms simultaneously into a hybrid model to provide measurements from the atmosphere, and predicted conditions based on such measurements. For example, a multifunctional instrument 104 in accordance with embodiments of the present disclosure can include a deep learning algorithm 242 that, based on information from sensors included in the multifunctional instrument 104, provide as outputs enhanced wind vector values, enhanced clear air turbulence intensity values, enhanced correlation between OAWL turbulence detection and sensing by accelerometers 220 as the aircraft 100 flies through the turbulent path, and/or reinforcement learning-based optimized course of action, such as actions to change a laser range gate of a lidar system 204, to inform a pilot or auto pilot to change a flight path or stay the course, and the like.

Moreover, as can be appreciated by one of skill in the art after consideration of the present disclosure, optimization of a lidar system 204 range gate enhances the efficient collection of data. For instance, when the strength of a return signal 120 is low, the range gate length along which wind speed measurements are made can be increased, which decreases range resolution, but increases sensitivity.

Embodiments of the present disclosure incorporating deep learning can provide continuously learned spatial and temporal analytics. In particular, the model implemented by the algorithm 242 can identify and learn from recurring weather patterns over time including weather patterns in the form of data collected by a multifunctional instrument 104 as described herein. The deep learning can also address spatial correlation, including the spatial dynamic influence of atmospherics on weather phenomena and associated predictions provided as output by the algorithm 242. Embodiments of the present disclosure can additionally incorporate reinforcement learning. As a result, embodiments of the present disclosure can provide for optimized courses of action in guidance provided regarding an optimal flight path for an aircraft 100, and for the operation of instruments and sensors included in a multifunctional instrument 104 as disclosed herein.

Although various embodiments of a multifunctional instrument 104 having particular features have been described, other configurations are possible. For example, different interferometer 228 configurations can be incorporated into the multifunctional instrument 104. For instance, rather than incorporating a single interferometer 228 capable of operating at a plurality of wavelengths, a plurality of interferometers 228 that each operate at a single wavelength can be included. As another example, interferometers for handling different wavelengths and that are capable of handling different numbers of wavelengths can be included in any combination.

As another example, an interferometer 228 included in a multifunctional instrument in accordance with embodiments of the present disclosure need not incorporate a field widening lens arrangement. For instance, rather than a set of mirrors, the interferometer 228 can include a hexagonal beam splitter.

The information available from a multifunctional instrument 104 as described herein can include data collected from returns at multiple wavelengths indicating the presence, magnitude, and direction of atmospheric winds, from within multiple fields of regard at different angles relative to the instrument. The data can additionally include information regarding the presence of ice, ash, or dust particles in the atmosphere. Moreover, information regarding the presence and location of clouds can be obtained. The data collected by the multifunctional instrument 104 can be processed using artificial intelligence-based deep and reinforcement learning processing algorithms 242 to provide real-time and near-real time weather predictions, wind-aided navigation, turbulence predictions, and/or courses of action for use by an aircraft 100 carrying the multifunctional instrument 104, by other aircraft, or by other data consumers. Predictions and forecasts regarding measurements made using remote sensing instruments included in the multifunctional instrument 104 can be validated against measurements of actual conditions, for example as detected by other sensors or instruments, including but not limited to an accelerometer 220 or the perceptions of a pilot of the aircraft 100. Moreover, validation results can be used to refine the training and operation of the algorithm 242. In addition to providing information useful to ensuring a smooth and safe flight, prediction and measurements made by a multifunctional instrument 104 in accordance with embodiments of the present disclosure can aid in efficiency, for instance by assisting the aircraft 100 in locating altitudes at which favorable wind conditions are present.

In accordance with at least some embodiments of the present disclosure, the technology encompasses:

(1) A multifunctional instrument, comprising:
a laser source;
an interferometer;
a beam division mechanism, wherein the beam division mechanism directs light from the laser source to a first field of regard, wherein the beam division mechanism directs light from the laser source to a second field of regard, wherein the beam division mechanism directs light from within the first field of regard to the interferometer, and wherein the beam division mechanism directs light from within the second field of regard to the interferometer.

(2) The multifunctional instrument of (1), wherein the beam division mechanism directs light from within the first field of regard and light from within the second field of regard to the interferometer at different times.

(3) The multifunctional instrument of (1), wherein the laser source outputs light having a first wavelength that is directed to the first field of regard, wherein the laser source outputs light having the same or a second wavelength that is directed to the second field of regard, and wherein light from the first field of regard and light from the second field of regard are provided to the interferometer simultaneously.

(4) The multifunctional instrument of (3), wherein the interferometer provides a first optical path difference for light of the first wavelength and a second optical path difference for light of the second wavelength.

(5) The multifunctional instrument of any of (1) to (4), further comprising:
an infrared camera, wherein the infrared camera has a field of view that encompasses at least the first field of regard of the optical autocovariance lidar.

(6) The multifunctional instrument of any of (1) to (5), further comprising:
a plurality of detectors, wherein a first subset of the detectors receives light of the first wavelength, wherein a second subset of the detectors receives light of the second wavelength, wherein the light received at a first detector of the first subset of detectors is spaced in phase from the light received at a second detector of the first subset of detectors by a nominal 90 degrees, and wherein the light received at a first detector of the second subset of detectors is spaced in phase from the light received at a second detector of the second subset of detectors by a nominal 90 degrees.

In accordance with further aspects of the present disclosure, the technology encompasses:

(7) A multifunctional instrument, comprising:
a lidar system, including:
a first laser source;
an interferometer; and
detectors; and
a control system, including:
memory, wherein a machine learning algorithm is stored in the memory; and
at least a processor, wherein the processor is operable to execute the machine learning algorithm, wherein wind measurement data is collected by the lidar system and provided to the machine learning algorithm, wherein the algorithm operates to predict turbulence or provide navigation information from the wind measurement data.

(8) The multifunctional instrument of (7), further comprising:
an accelerometer, wherein actual turbulence measurement data is collected by the accelerometer and is provided as an input to the machine learning algorithm.

(9) The multifunctional instrument of (7) or (8), wherein the machine learning algorithm is trained using correlated wind measurement data and actual turbulence measurement data.

(10) The multifunctional instrument of any of (7) to (9), wherein the interferometer includes at least first and second fields of regard.

(11) The multifunctional instrument of any of (7) to (10), wherein the interferometer includes:
a first, forward looking field of regard;
a second, upward looking field of regard; and
a third, downward looking field of regard.

(12) The multifunctional instrument of any of (7) to (11), further comprising:
an infrared camera.

(13) The multifunctional instrument of any of (7) to (12), wherein the machine learning algorithm is a deep neural network.

In accordance with still further aspects of the present disclosure, the technology encompasses:

(14) A method of detecting turbulence in the atmosphere, comprising:
making wind speed measurements along a series of angles centered around the direction of travel of an aircraft;
detecting turbulence experienced by the aircraft;
correlating the wind speed measurements to the detected turbulence experienced by the aircraft; and
training a machine learning algorithm using the correlated wind speed measurements and detected turbulence.

(15) The method of (14), wherein the machine learning algorithm is a deep neural network.

(16) The method of (14) or (15), wherein the wind speed measurements are obtained from a plurality of different ranges along the direction of travel of the aircraft.

(17) The method of any of (14) to (16), wherein the turbulence experienced by the aircraft is detected by sensors carried by the aircraft, and wherein correlating the wind speed measurements to the detected turbulence includes at least one of spatial correlation, temporal correlation, and amplitude correlation.

(18) The method of any of (15) to (17), further comprising providing an output from the deep neural network, wherein the output is a turbulence prediction, wind-aided navigation information and a suggestion to alter a flight parameter of the aircraft.

(19) The method of any of (14) to (18), further comprising:
taking wind measurements along a plurality of look angles, wherein at least some of the look angles do not correspond to the direction of travel of the aircraft.

(20) The method of any of (14) to (19), further comprising:
determining a strength of a return signal;
in response to determining that the strength of the return signal is low, increasing the range gate length along which the wind speed measurements are made.

The foregoing discussion of the disclosed systems and methods has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A multifunctional instrument, comprising:
a lidar system, including:
a laser source;
a beam division system; and
an interferometer
wherein the interferometer includes a plurality of detectors, wherein the lidar system has a first field of regard that encompasses a first target volume, wherein the lidar system has a second field of regard that encompasses a second target volume, wherein light of a first wavelength received from the laser source is directed by the beam division system to within the first field of regard, wherein light of a second wavelength received from the laser source is directed by the beam division system to within the second field of regard, wherein at least a first one of the detectors detects light returned from within the first field of regard, and wherein at least a second one of the detectors detects light returned from within the second field of regard; and
a control system, including:
memory, wherein a machine learning algorithm is stored in the memory; and
a processor, wherein the processor executes the machine learning algorithm, wherein wind measurement data from each of the first and second fields of regard are collected by the first and second detectors respectively of the lidar system and provided to the machine learning algorithm, wherein, in response to receiving the wind measurement data, the algorithm operates to at least one of predict a presence of turbulence within at least one of the target volumes or provide navigation information from the wind measurement data, and wherein the algorithm operates to output at least one of the predicted turbulence or the navigation information.

2. The multifunctional instrument of claim 1, further comprising:
an accelerometer, wherein actual turbulence measurement data is collected by the accelerometer and is provided as an input to the machine learning algorithm.

3. The multifunctional instrument of claim 2, wherein the machine learning algorithm is trained using correlated wind measurement data and actual turbulence measurement data.

4. The multifunctional instrument of claim 1, wherein the interferometer additionally includes a third field of regard that encompasses a third target volume, wherein light of a third wavelength is directed by the beam division system to within the third field of regard, and wherein a third one of the detectors detects light returned from within the third field of regard.

5. The multifunctional instrument of claim 4, wherein:
the first field of regard is a forward looking field of regard;
the second field of regard is an upward looking field of regard; and
the third field of regard is a downward looking field of regard.

6. The multifunctional instrument of claim 1, further comprising:
an infrared camera.

7. The multifunctional instrument of claim 1, wherein the machine learning algorithm is a deep neural network.

8. The multifunctional instrument of claim 1, wherein the laser source outputs light at multiple wavelengths, wherein light output by the laser source and having the first wavelength is directed along a first line of sight within the first field of regard, and wherein light output by the laser source and having the second wavelength is directed along a second line of sight within the second field of regard.

9. The multifunctional instrument of claim 8, wherein the lidar system further includes a beam division mechanism, wherein the beam division mechanism separates the light of the first wavelength from the light of the second wavelength.

10. The multifunctional instrument of claim 1, wherein the lidar system includes first and second laser sources, wherein the first laser source outputs light having the first wavelength that is directed along a first line of sight within the first field of regard, and wherein the second laser source outputs light having the second wavelength that is directed along a second line of sight within the second field of regard.

11. The multifunctional instrument of claim 1, further comprising:
a polarizing beam splitter; and
a detector, wherein light of a selected polarization is transmitted along a first line of sight within the first field of regard, wherein the polarizing beam splitter passes light of a first polarization received from within the first field of regard to the interferometer, and wherein the polarizing beam splitter passes light of a second polarization received from within the first field of regard to the detector.

12. The multifunctional instrument of claim 1, wherein the laser source outputs light having the first wavelength that is directed to the first field of regard, wherein the laser source outputs light having the second wavelength that is directed to the second field of regard, and wherein light from the first field of regard and light from the second field of regard are provided to the interferometer simultaneously.

13. The multifunctional instrument of claim 12, wherein the interferometer provides a first optical path difference for light of the first wavelength, wherein the interferometer provides a second optical path difference for light of the second wavelength, wherein the light of the first wavelength is received at a first set of detectors, and wherein the light of the second wavelength is received at a second set of detectors.

14. The multifunctional instrument of claim 13, wherein the light of the first wavelength and the light of the second wavelength are output from the laser source simultaneously, and wherein the first and second detectors provide outputs to the control system simultaneously.

15. The multifunctional instrument of claim 1, further comprising:
an infrared camera, wherein the infrared camera obtains temperature information from within a field of view that encompasses the first field of regard.

16. The multifunctional instrument of claim 1, wherein the algorithm further operates to output a direction to change a range gate of the lidar system.

17. The multifunctional instrument of claim 16, wherein the range gate of the lidar system is lengthened in response to determining that a strength of a return signal is low.

18. The multifunctional instrument of claim 1, wherein the output of the algorithm is provided in real time.

19. The multifunctional instrument of claim 1, wherein the output of the algorithm is provided after a processing delay of less than one second.

20. The multifunctional instrument of claim 1, wherein a first subset of the detectors detects light of the first wavelength, and wherein a second subset of the detectors detects light of the second wavelength.

* * * * *